DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1365

T889,015

GRAIN INHIBITOR FOR VACUUM-DEPOSITED SILVER HALIDE ELEMENTS

Arthur A. Rasch, Kodak Park, Rochester, N.Y. 14650

Filed Sept. 18, 1970, Ser. No. 73,676

Int. Cl. G03c *1/06, 5/30*

No Drawing. 10 Pages Specification

The addition of 3-amino-4-methyl-2-(3H)-thiazolethione, either in a hydrophilic colloid overlayer on a photoelement prepared with vacuum-deposited silver halide or to the developing composition for such an element, operates to reduce the graininess of the developed photographic silver image.